F. M. PRATHER.
PNEUMATIC POWER TRANSMISSION MECHANISM.
APPLICATION FILED NOV. 7, 1911.
1,055,557.
Patented Mar. 11, 1913.
4 SHEETS—SHEET 1.
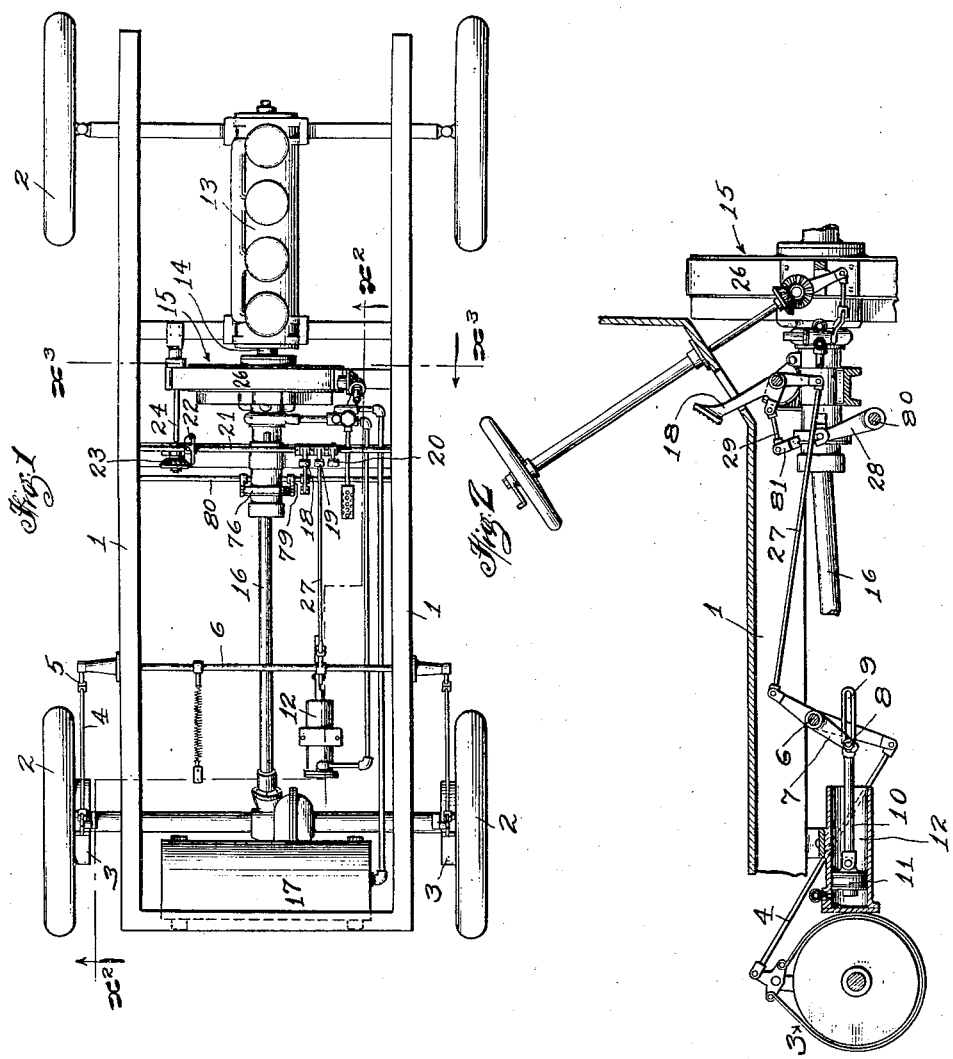

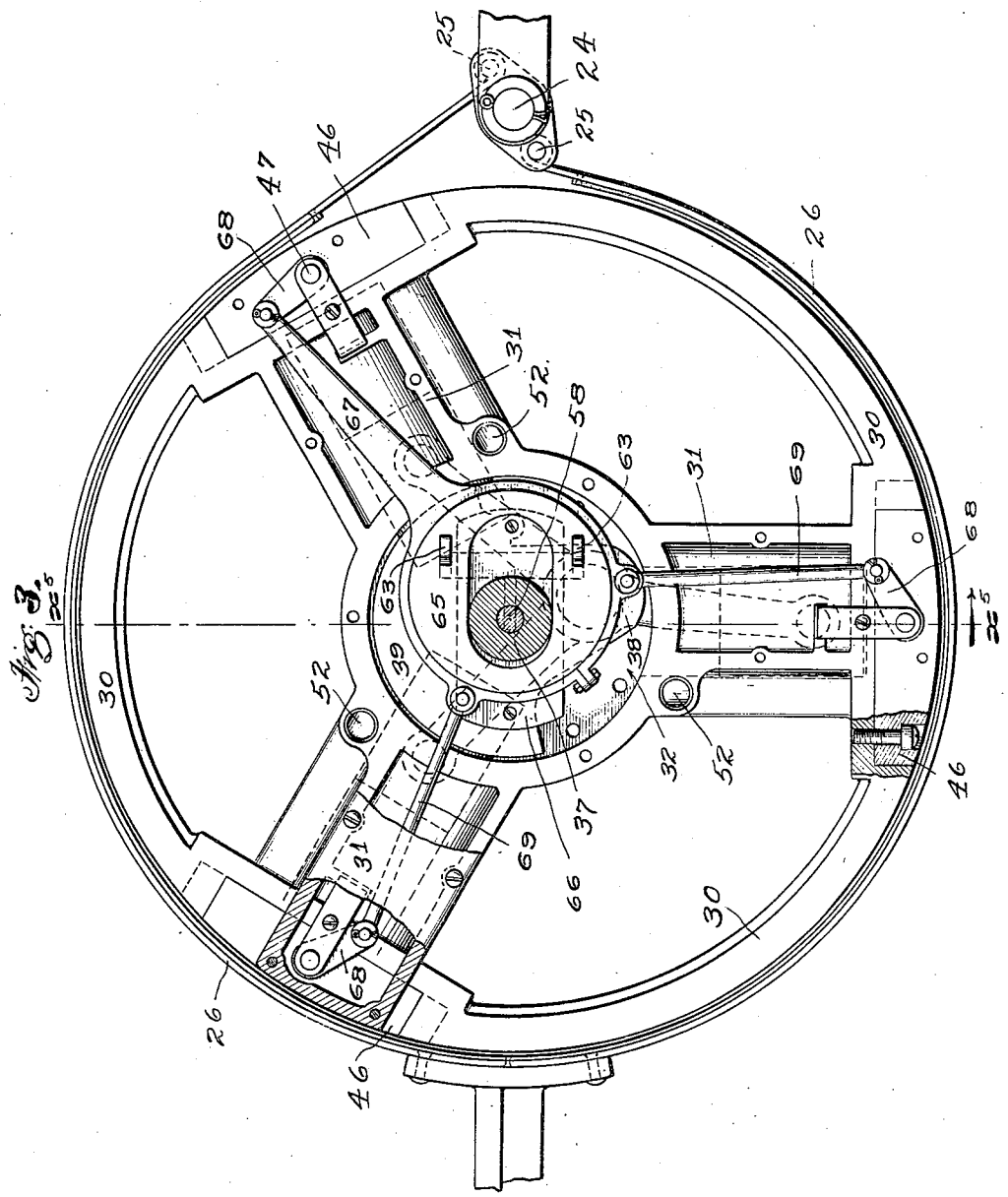

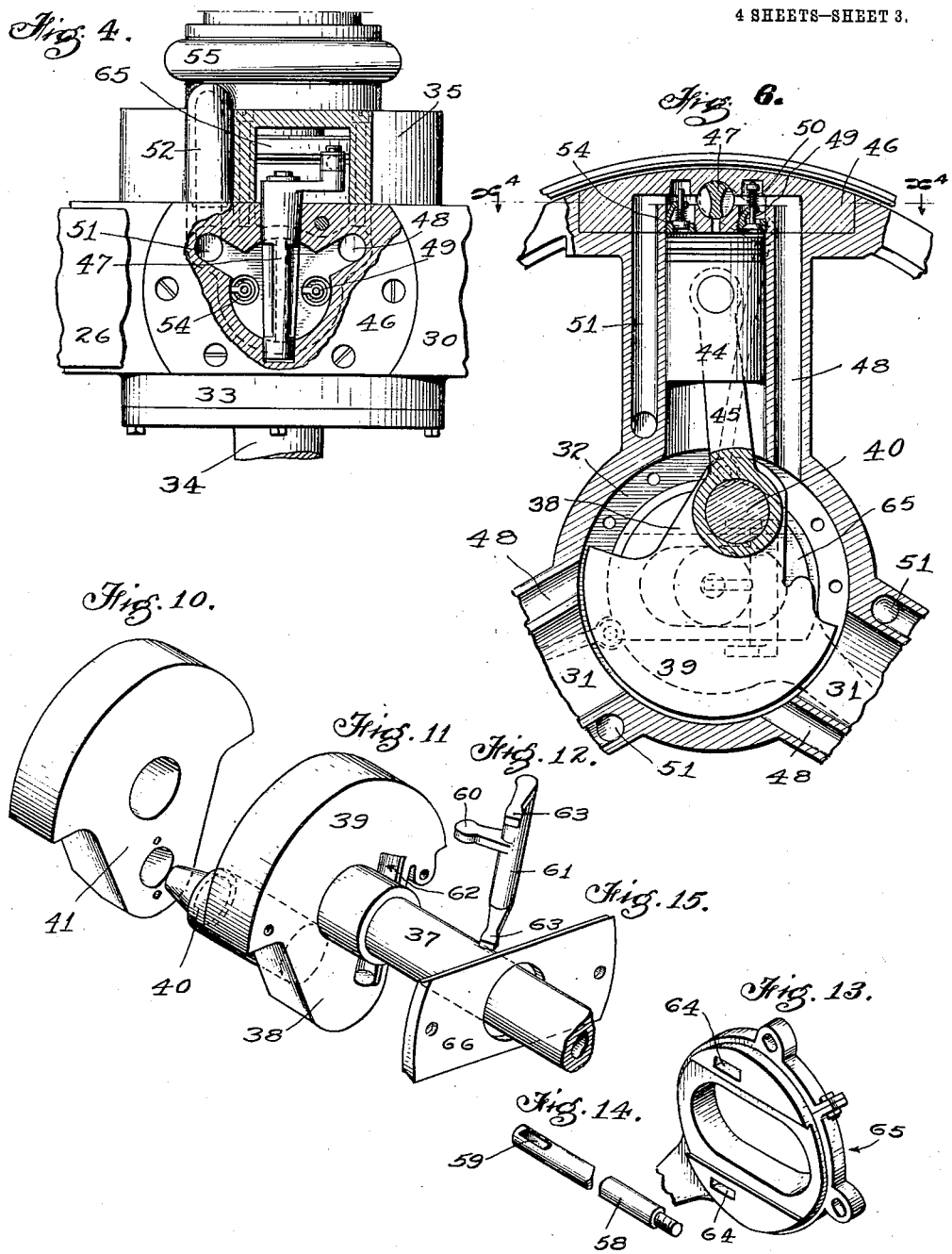

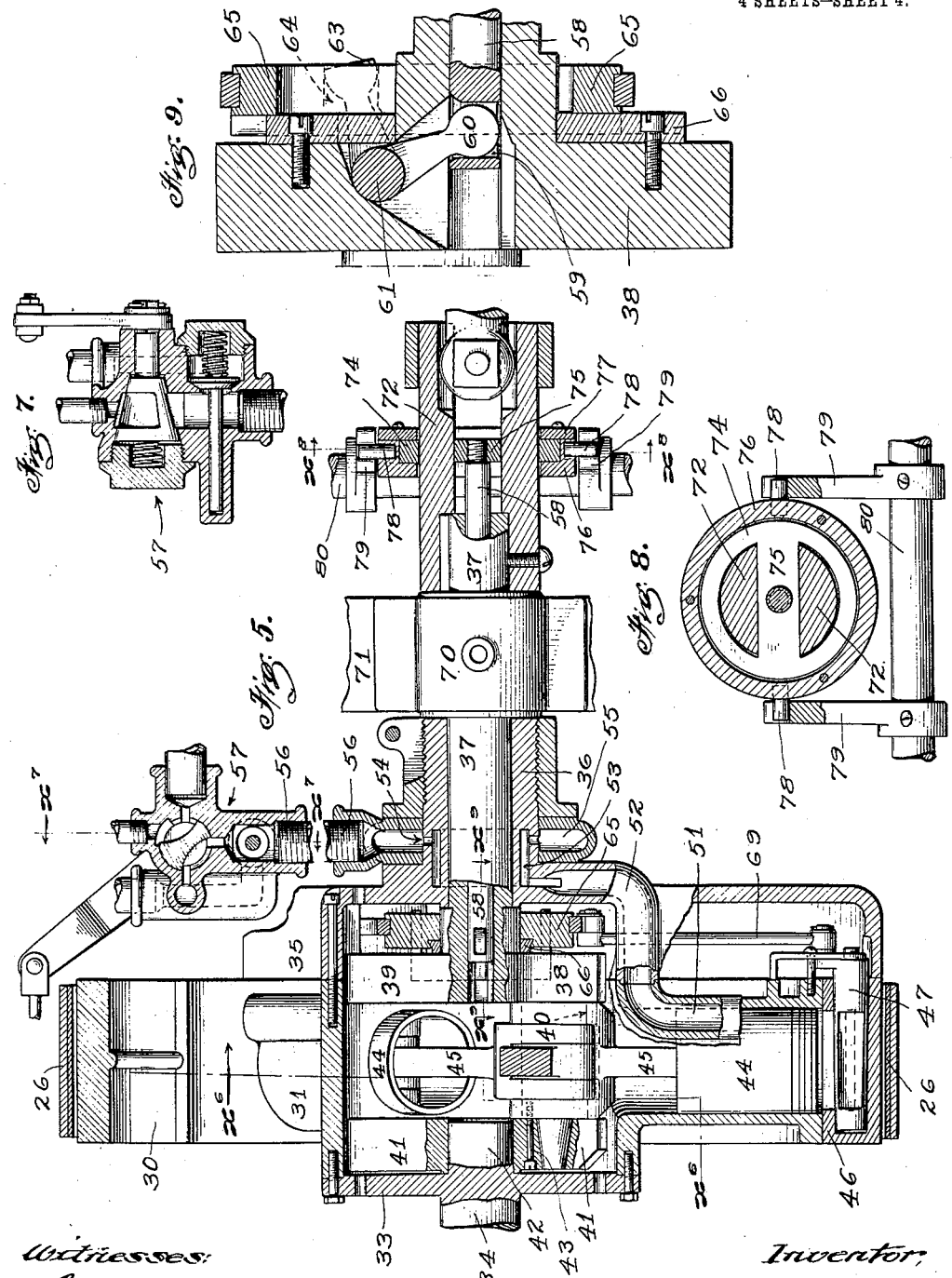

UNITED STATES PATENT OFFICE.

FRANK M. PRATHER, OF LOS ANGELES, CALIFORNIA.

PNEUMATIC POWER-TRANSMISSION MECHANISM.

1,055,557.     Specification of Letters Patent.     Patented Mar. 11, 1913.

Application filed November 7, 1911. Serial No. 659,066.

*To all whom it may concern:*

Be it known that I, FRANK M. PRATHER, a citizen of the United States, residing at Los Angeles, in the county of Los Angeles and State of Cailfornia, have invented new and useful Improvements in Pneumatic Power-Transmission Mechanism, of which the following is a specification.

In a former application of mine, filed April 12th, 1911, Serial No. 620,692, I have shown and described a pneumatic power transmission wherein a series of radial cylinders are connected to the driving shaft with pistons in the cylinders connected to the driven shaft, and valve mechanism for controlling the air passages of the cylinders, whereby the device may be used as a clutch to operate the driven shaft from the driving shaft, or with the driven shaft stationary, the device may be operated as a motor to turn the driving shaft to start the motor. In addition to the above functions the device embraced several other functions. In the former construction the valves in the ends of the cylinders for controlling the air circulation were mechanically operated, and there was a back rush of air in the air passages, on the outlet side, which backed up into the cylinders and necessitated recompression.

The main object of the present invention is to avoid this difficulty, by an improved valve mechanism. In the present case, I employ valves which automatically close.

Other advantages of the invention will appear in the following specification.

Referring to the drawings:—Figure 1 is a plan view of an automobile, equipped with a mechanism forming my invention. Fig. 2 is a sectional view on line $x^2$—$x^2$ Fig. 1, the view being on an enlarged scale. Fig. 3 is a sectional view on line $x^3$—$x^3$ Fig. 1, on an enlarged scale. Fig. 4 is a section on line $x^4$—$x^4$ Fig. 6. Fig. 5 is a section on line $x^5$—$x^5$ Fig. 3. Fig. 6 is a vertical section on line $x^6$—$x^6$ Fig. 5. Fig. 7 is a section on line $x^7$—$x^7$ Fig. 5. Fig. 8 is an enlarged section on line $x^8$—$x^8$ Fig. 5. Fig. 9 is a section on enlarged scale, on line $x^9$—$x^9$ Fig. 5. Fig. 10 is a perspective view of the outer crank. Fig. 11 is a perspective view of the inner crank. Fig. 12 is a perspective view of the bell crank rock lever. Fig. 13 is a perspective of the slide eccentric. Fig. 14 is a perspective of the shift rod. Fig. 15 is a perspective view of the supporting plate for the eccentric.

Referring to Fig. 1, 1 designates an automobile frame with driving wheels 2, and brakes 3 on the driving wheels, connected by rods 4 with arms 5 projecting from a rock shaft 6. On the rock shaft 6 is an arm 7 with a pin 8 which engages in a slot 9 formed in a piston rod 10 which is operated by a piston 11 in a brake cylinder 12. 13 is the motor with driving shaft 14. 15 designates the pneumatic power transmitter, 16 the driven shaft, and 17 the storage tank for compressed air. 18 designates a pedal for operating the reverse mechanism, 19 a pedal for operating the brakes 3, and 20 a pedal for operating a rock shaft 21 which carries a segmental bevel gear 22 meshing with a bevel gear 23 on a shaft 24, the shaft 24 having a double arm 25 to both ends of which is connected a brake band 26 which encircles the cylinder member 15 of the pneumatic power transmitter, as clearly shown in Fig. 3, so that when the pedal 20 is operated, brake band 26 will prevent rotation of the cylinder member 15 of the pneumatic transmitter. When the pedal 19 is operated, it pushes the rod 27 rearwardly which moves arm 7 forwardly, pin 8 traveling freely forward in the slot 9 and in slotted arm 7, and shaft 6 is thus rocked which moves forward arms 5 and draws rods 4, thus operating brakes 3. When pedal 18 is operated, it actuates a forked arm 28 through the medium of a link 29, and the forked arm 28 operates a reversing device which will be described.

The pneumatic power transmitter comprises in the present embodiment, a flywheel 30 which is formed with three cylinders 31 and with a central circular crank chamber 32 to which is attached a disk 33 on the end of a driving shaft 34. Secured to the other side of the crank chamber 32 is a cap 35 which is formed with a hub 36 in which is mounted one end of the driven shaft 37, on the end of which is a crank 38 with counter-balance 39, the crank 38 being connected by a crank pin 40 with a crank 41 journaled on a boss 42 projecting from the end of the driving shaft 34 and also provided with a counter-balance, the crank 41 being detachably secured to the crank pin 40 by screws 43. Sliding in the cylinders 31 are trunk pistons 44, each of which has a connecting rod 45 which is connected with the crank pin 40. Inserted in the fly-wheel 30 and flush therewith at the end of each cylinder is a plate 46, each of which has a rock-valve 47. Extending along one side of each cylinder is a passage 48 which communicates with the crank chamber at its inner end, and at its outer end communicates with one side of the valve 47. A check valve 49, as clearly shown in Fig. 6 is arranged in the head of the cylinder between the passage 48 and the cylinder, the check valve opening into the cylinder, but being yieldingly held closed by a coil spring 50. Extending along the other side of the cylinder is a passage 51 which at its outer end communicates with the valve 47, and at its inner end communicates, as shown in Fig. 5, with a pipe 52, which leads to an annular chamber 53 formed in the hub 36 and with which chamber each pipe 52 from each cylinder communicates. A check valve 54 is arranged in the head of the cylinder, as shown in Fig. 6, between the passage 51 and the cylinder, and opens outwardly, permitting air from the cylinder to pass to the passage 51. The annular chamber 53 communicates through a series of ports 54 with an annular ring 55, the latter being connected by a pipe 56 with a controlling valve 57, a detailed description of which will be found in the application previously referred to.

The present invention thus far described, differs only from the previous application referred to, in the provision of the check valves 50 and 54, the check valve 50 acting to permit air from passage 48 to pass into the cylinder, and check valve 54 permitting air which is compressed in the cylinder to pass out therethrough into the passage 51 and thence to the air tank 17. It is obvious that when air is compressed by the piston in the cylinder, it will pass through the check valve 54 and the latter will automatically close, preventing any back rush of air and thereby obviating the necessity of any recompression, while in the previous application the valve 47 was relied on and being mechanically operated did not close quickly enough to prevent the back rush of air which the check valve 54 prevents. In addition to this novel feature, the present invention also includes an improved form of construction of the mechanism for reversing the operation of the valves 47, this mechanism being shown in Fig. 3 and in detail in Figs. 8 to 14 inclusive.

The shaft 37 is hollow and sliding therein is a rod 58, the inner end of which has a slot 59 which engages an arm 60 on a shaft 61, the shaft 61 lying in a recess 62 which is formed in the crank 38, as clearly shown in Fig. 11. The shaft 61 also has arms 63 which engage in slots 64 in an eccentric 65, shown in detail in Fig. 13, the eccentric 65 being slidable on a plate 66, having beveled edges, the plate 66 being secured to the crank 38. As clearly shown in Fig. 3, the eccentric 65 has an arm 67 which is connected to an arm 68 which operates one of the valves 47, while links 69 are connected to the eccentric 65 and with similar arms 68 on the other two valves 47, so that as the eccentric rotates, the arms 68 will oscillate to rock the valves 47. The oscillation of the valves 47 when the eccentric 65 is at one side, serving to alternately place the passages 48 in communication with the cylinders. By shifting the eccentric 65 on its supporting plate 66 to the opposite position, the valves 47 will be caused to alternately place the passages 51 in communication with the cylinder.

70 designates a stationary bearing which is supported by a brace 71 connected to the frame 1. Keyed to the end of the shaft 37 is a sleeve 72 which is diametrically slotted beyond the shaft 37 and arranged to slide on the sleeve 72 is a ring 74 with a diametrical bar 75 which extends through the slotted portion of the sleeve 72 and the end of the rod 58 is screwed to the bar 75. Encircling the ring 74 is a grooved ring 76 having a detachable plate 77 permitting its removal, and the ring 76 is provided with trunnions 78 which are engaged by forked levers 79 mounted on a shaft 80, the shaft 80 having an arm 81, see Fig. 2, which is connected by a link 29 with a pedal 18. By operating the pedal 18 the arm 79 may be rocked to shift the ring 77 and slide the ring 74 and rod 58, and thereby move the eccentric 65 from one position to the other.

The automobile is propelled forward by so adjusting the controlling valve 57 that air compressed by the pistons 44 will pass into the storage tank 17 and when a sufficient pressure has accumulated such that the pistons will not compress to any higher pressure in the cylinders, the pistons will cause the cylinders to revolve in unison with them. It is during the compressing action of the pistons that the check valves 54 become operative, permitting the air to pass toward the tank when compressed and automatically closing to prevent air from passing back into the cylinder during the compression stroke. During the suction stroke the valve 50 opens to permit air to pass into the cylinder to be compressed and automatically closing upon the compression stroke. The operation of these two valves takes place automatically. The valve 47 is operated mechanically and is controlled by operating pedal 18 which through the before described mechanism may be operated to cause the eccentric 65 to shift from one position to another, the eccentric 65 in turn controlling the valves 47. With the automobile at rest the pedal 20 may be operated to prevent rotation of the cylinder member 15 of the pneumatic transmitter and then by adjusting valve 57, air may be admitted from the tank 17 into the stationary cylinders and cause the pistons 44 to reciprocate thereby rotating the shaft 14 and starting the engine. After the engine has been started pedal 20 may be released. With the engine running and valve 57 adjusted to exhaust into the atmosphere, the air which is displaced in the cylinders by the piston will pass into the atmosphere instead of being compressed into the tank and as under such conditions there is no resistance between the pistons and cylinders, the cylinders do not revolve and the vehicle remains stationary. If it be desired to apply the brakes, the pedal 19 may be operated. This mechanically operates the brakes 3. The brakes 3 may also be operated pneumatically by adjusting the valve 57 to permit air to pass through suitable connections to the brake cylinder 12, but as these features form no part of the present invention they have not been described in detail herein. If it be desired to operate the reverse mechanism, the pedal 18 is employed as before described.

What I claim is:

1. A driving shaft, a driven shaft, cylinders connected to one of said shafts, pistons in the cylinders connected with the other shaft, inlet and exhaust passages for each cylinder, automatic inlet and exhaust valves for controlling communication between each cylinder and its inlet and exhaust passages, and a mechanically operated valve for placing the cylinder in communication with its inlet or exhaust passage.

2. A driving shaft, a driven shaft, compression means operated by relative movement between said shafts, a valve for controlling the passage of air through said compression means, an eccentric for operating said valve carried by one of said shafts, said eccentric being slidable transversely of said latter shaft, arms engaging said eccentric, a rod to which said arms are attached, mounted to rock transversely of the axis of said eccentric, said latter shaft being hollow, an arm projecting from said rod into said hollow shaft, said shaft having a slot permitting a rocking movement of the latter arm, a rod slidable in said shaft and engaging said arm within the shaft, and means for shifting said rod.

3. A driving shaft, a driven shaft, compression means operated by relative movement between said shafts, a valve for controlling the passage of air through said compression means, an eccentric for operating said valve carried by one of said shafts, said eccentric being slidable transversely of said latter shaft, arms engaging said eccentric, a rod to which said arms are attached, mounted to rock transversely of the axis of said eccentric, said latter shaft being hollow, an arm projecting from said rod into said hollow shaft, said shaft having a slot permitting a rocking movement of the latter arm, a rod slidable in said shaft and engaging said arm within the shaft, means for shifting said rod, a sleeve on said shaft, said sleeve having a diametrical slot, a ring sliding on said sleeve and having a diametrical bridge which passes through the slot in the sleeve, the rod in said hollow shaft being connected to said bridge, a grooved collar engaging said ring, trunnions in said grooved collar, and a pair of forked arms engaging said trunnions.

4. A driving shaft, a driven shaft, compression means operated by a relative movement between said shafts, a valve for controlling the operation of the compression means, a crank disk on one of said shafts and having a hub, a plate on said hub, an eccentric with an elongated slot receiving said shaft, said eccentric being slidably mounted on said plate, said crank disk having a transverse recess, a rod mounted to rock in said recess and having a pair of arms, said eccentric having slots receiving said arms, said rod having another arm, said shaft having a slot receiving the latter arm, a rod slidable in said shaft and engaging the latter arm and means for sliding said rod.

In testimony whereof, I have hereunto set my hand at Los Angeles Cal. this 19 day of October 1911.

FRANK M. PRATHER.

In presence of—
   G. T. HACKLEY,
   GLADYS RUSSELL.